United States Patent [19]

Murray

[11] 4,119,956

[45] Oct. 10, 1978

[54] RASTER-SCAN DISPLAY APPARATUS FOR COMPUTER-GENERATED IMAGES

[75] Inventor: Paul Michael Murray, Tunbridge Wells, England

[73] Assignee: Redifon Flight Simulation Limited, Crawley, England

[21] Appl. No.: 698,708

[22] Filed: Jun. 22, 1976

[30] Foreign Application Priority Data

Jul. 16, 1975 [GB] United Kingdom ............... 29812/75
Jun. 30, 1975 [GB] United Kingdom ............... 27459/75

[51] Int. Cl.[2] ................................................ G06F 3/14
[52] U.S. Cl. ............................................ 340/324 AD
[58] Field of Search ....... 178/30; 340/324 A, 324 AD

[56] References Cited

U.S. PATENT DOCUMENTS

| | | | |
|---|---|---|---|
| 3,603,962 | 9/1971 | Lechner | 340/324 AD |
| 3,792,464 | 2/1974 | Hamada et al. | 340/324 AD |
| 3,811,113 | 5/1974 | Saito et al. | 340/324 AD |
| 3,812,491 | 5/1974 | Barraclough et al. | 340/324 AD |
| 3,930,251 | 12/1975 | Salava et al. | 340/324 AD |

*Primary Examiner*—Marshall M. Curtis
*Attorney, Agent, or Firm*—Alfred B. Levine

[57] ABSTRACT

A raster-scan display system for computer-generated images in which each raster line is quantized into a number (N) of sets of image elements each successive set being displaced in time, with respect to the line start, by 1/N of the duration of one element. The corresponding video signals are summed for each line and the resultant signal is displayed. The technique provides a visual image with graded intensity changes more nearly simulating a television type image, instead of a stepwise changing image. In one form of the invention, a triangular hold technique is used, that is, the display is delayed to permit of a linearly changing intensity charge between consecutive elements of different intensity.

6 Claims, 22 Drawing Figures

RASTER-SCAN DISPLAY APPARATUS FOR COMPUTER-GENERATED IMAGES

This invention relates to visual display systems for displaying computer-generated information, which may include alphanumerical, graphic and pictorial information, in monochrome or in colour, by means of cathode ray tube (C.R.T.) display apparatus using a raster-scan display system similar to that used for conventional television displays.

One application of such display systems is for the display of alphnanumerical data to monitor continuously the performance of apparatus, for example of an aircraft in flight or of ground-based flight simulation apparatus, and particularly to dispaly information of any fault which may develop.

Another application of such display systems is for the display of computer-generated imagery (C.G.I.). Such a C.G.I. display for use in association with ground-based aircraft flight simulation apparatus involves a display in colour, size, perspective and viewing angle, to display in two dimensions the three-dimensional features of terrain surface features, airport details, including runways, runway markings and buildings, and distant geographical features, such as land, mountain and water areas and also, in some cases, other airborne aircraft.

The display of computer-generated information, including such alphanumerical, graphic and pictorial information, in raster-scan form, is usually based on the assumption that the length of each raster line is quantised into a number of contiguous elemental areas, each being one raster line high and of a length determined by the video bandwidth available. Each elemental area may then be addressed with the appropriate luminance and chrominance value to produce a total image covering one or more elemental areas and raster lines. This method produces a structure along a raster line which is similar in nature to that produced in adjacent raster lines. However, an analogue system such as a television camera gives resolution along a raster line which is different in nature to that obtained across raster lines, in that luminance and chrominance values are continuously variable along each line but varied stepwise between adjacent lines.

The object of the present invention is to provide a display system for computer-generated information, wherein each raster line is quantised into discrete elemental areas along its length but the resolution along each scan line more nearly corresponds to the continuous variation of luminance and chrominance provided in a conventional analogue television display.

Accordingly, the present invention provides a visual display system including means for quantising an input signal according to elemental areas along the length of each scan line in a first channel, similar means in a plurality of further channels for quantising the input signal according to elemental areas relatively displaced in time, that is along the line scan length, each channel with respect to the next, signal mixing means for summing individual output signals, and raster-scan display means supplied with the resultant signal from the said signal mixing means.

In one visual display system according to the invention, the signal mixing means are non-additive signal mixing means for summing the individual output signals of all the channels.

In an alternative visual display system according to the invention, the signal mixing means are additive signal mixing means for summing all channel outputs for each elemental area.

In a further visual display system according to the invention, there are provided means for applying a triangular hold within each sub-line before scanning by said raster-scan dispaly means.

In order that the invention may be readily carried into practice, features of a known display system and embodiments of the present invention will now be described in detail, the latter by way of example, with reference to the accompanying drawings, in which.

Figure 1:
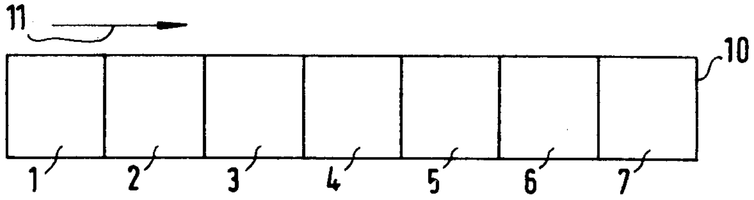
FIG. 1 is a diagram representing a part of the length of a single raster-scan line showing elemental areas which are contiguous along its length.
Figure 12:
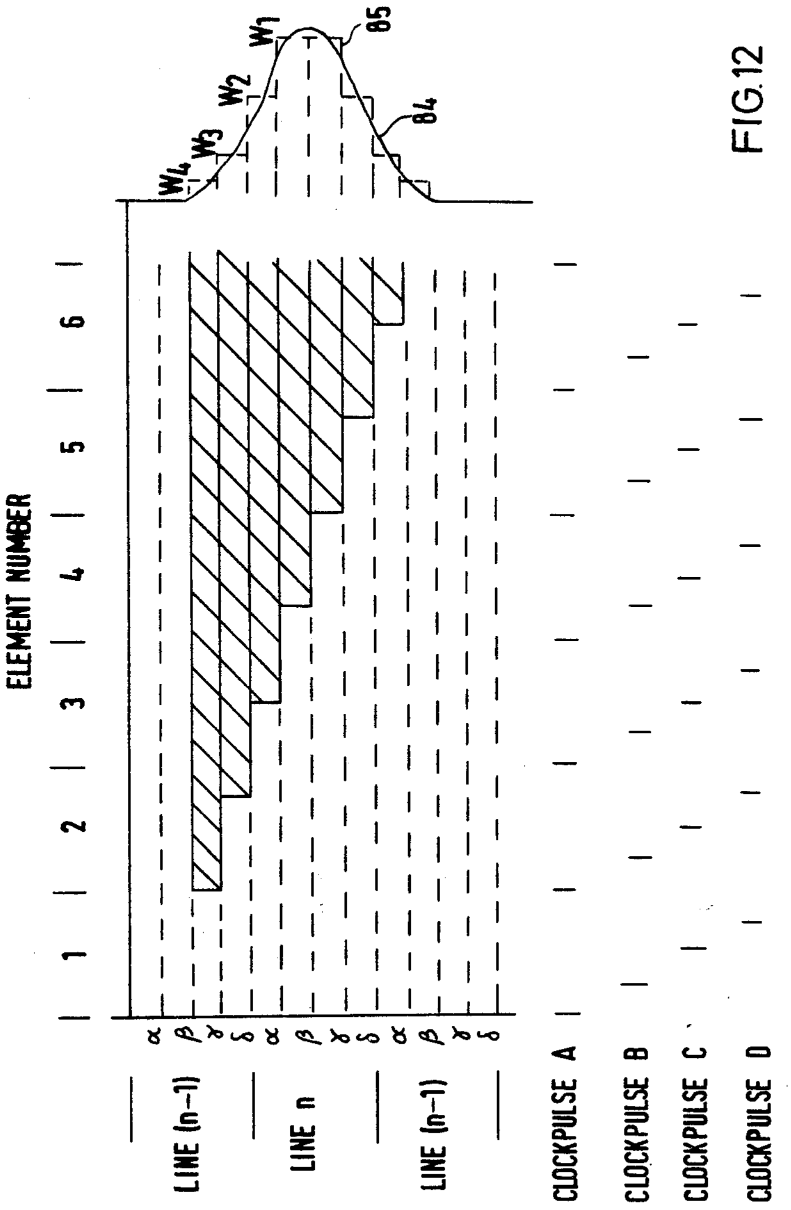
FIG. 12 shows how a transition from, say, black to white may be modelled in the sub-lines as a display, together with a scanning aperture.
Figure 13:
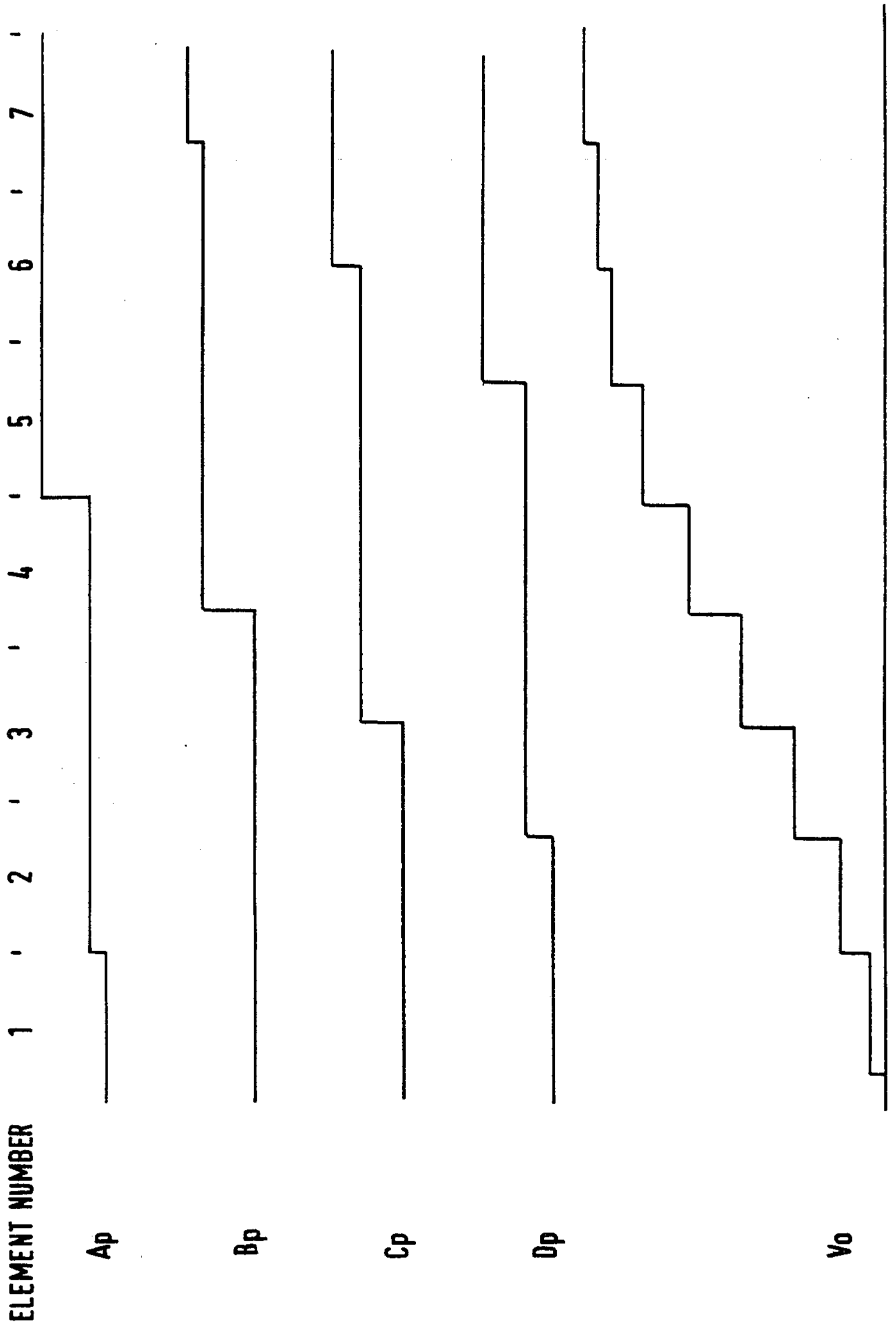
Figure 14:
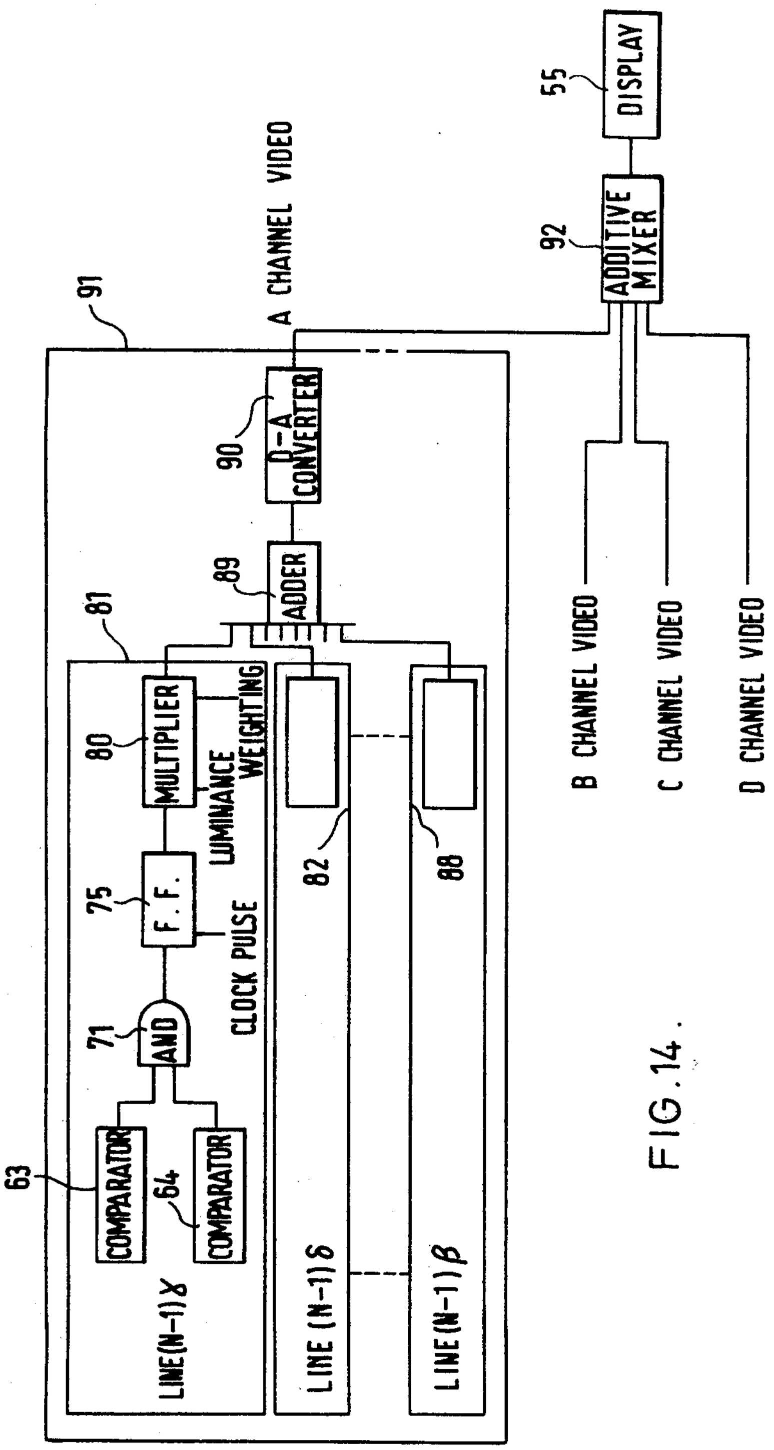
Figure 15:
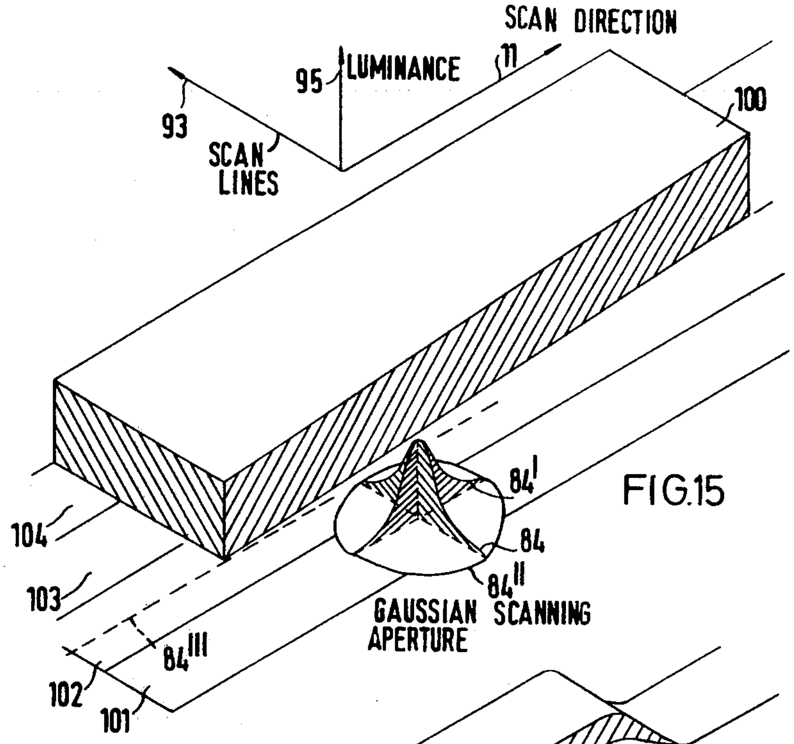
Figure 16:
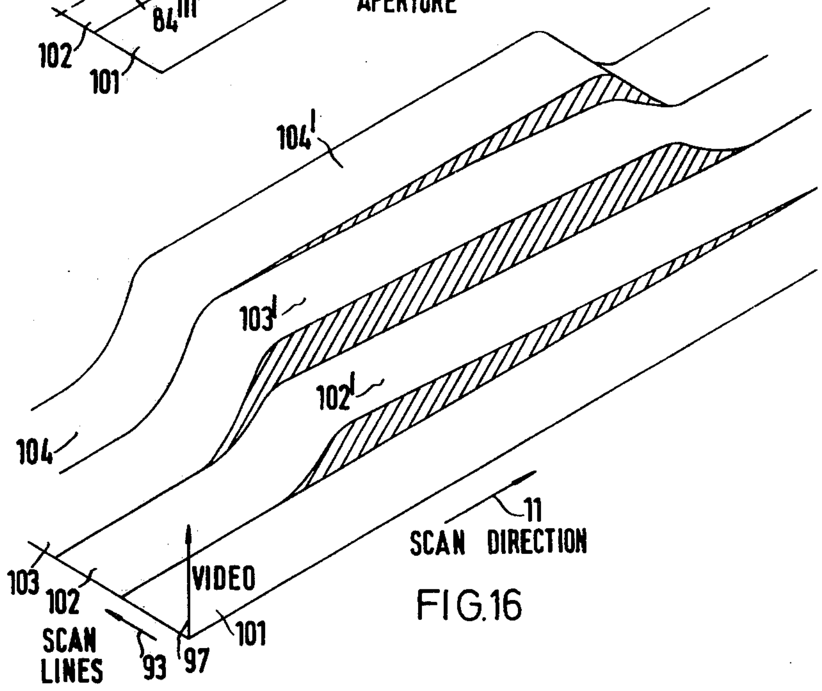
Figure 17:
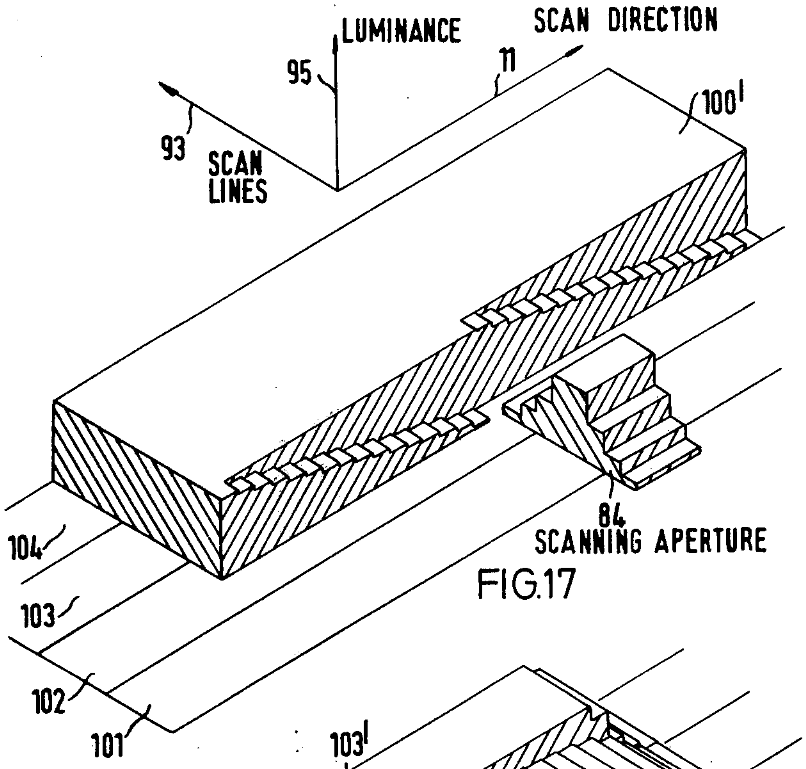
Figure 18:
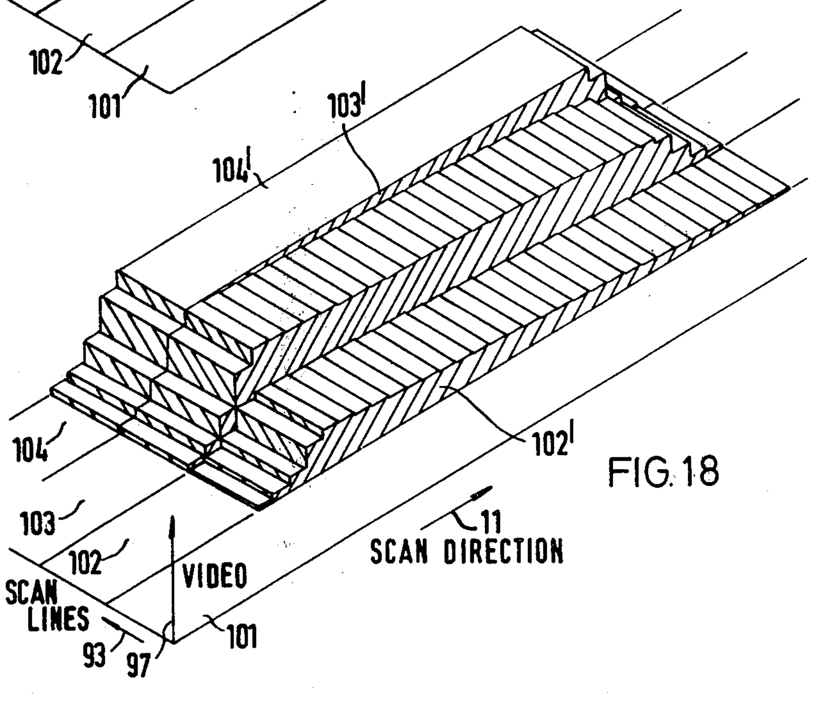
Figure 19:
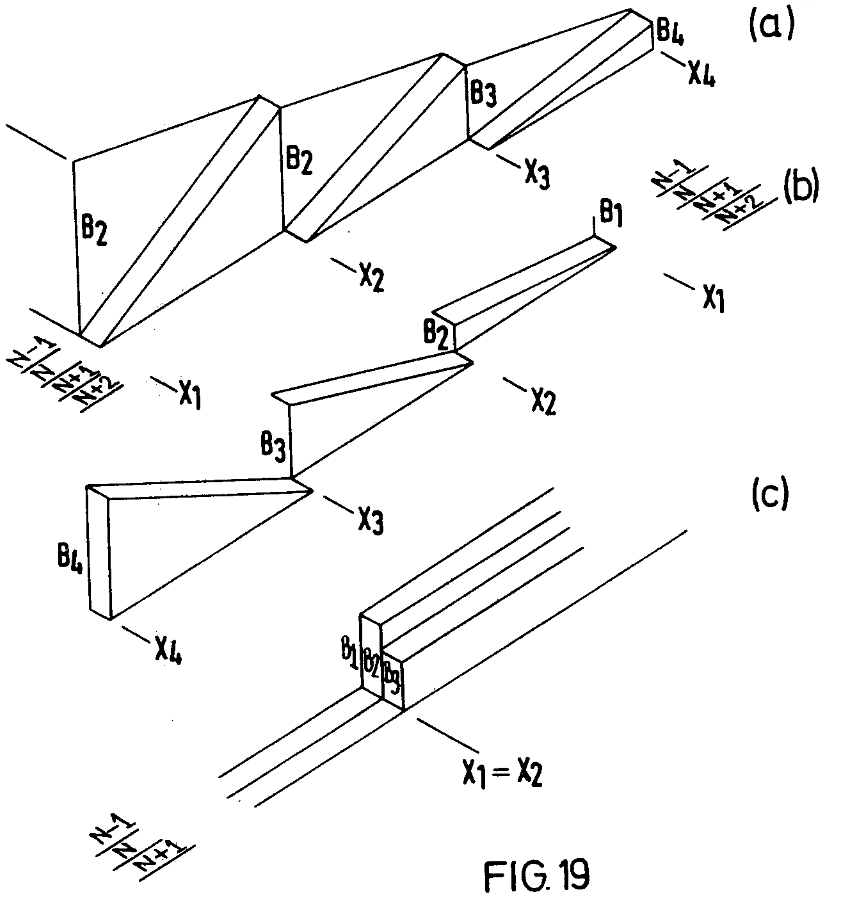

FIG. 13 shows the sum video obtained for each elemental channel by adding the aperture weighted luminance signals shown in FIG. 12, together with the video signal obtained by adding these elemental video signals over any addressable element on the display; and FIG. 14 shows a block schematic diagram of apparatus according to the invention for drawing light spots or line segments with improved positioning accuracy along each display line with the improved aperture effects described;

FIG. 15 is an isometric diagram representing a typical image, in relation to the raster scan of a camera tube of an analogue visual display system, one image edge being slightly oblique to the raster scan lines;

FIG. 16 is an isometric diagram representing the video signal structure produced by successive line scans of the image of FIG. 1;

FIG. 17 is an isometric diagram representing the image of FIG. 15 as it would be represented in the computer generated imagery (C.G.I) system described in this application, instead of the analogue system of FIG. 15;

FIG. 18 is an isometric diagram, comparable with FIG. 16, representing the video signal structure produced by successive line scans of the image of FIG. 17; and FIG. 19 is an isometric diagram in which the sub-lines, line segment start positions, and luminance values are defined for the purpose of the descriptive equations.

Figure 20:
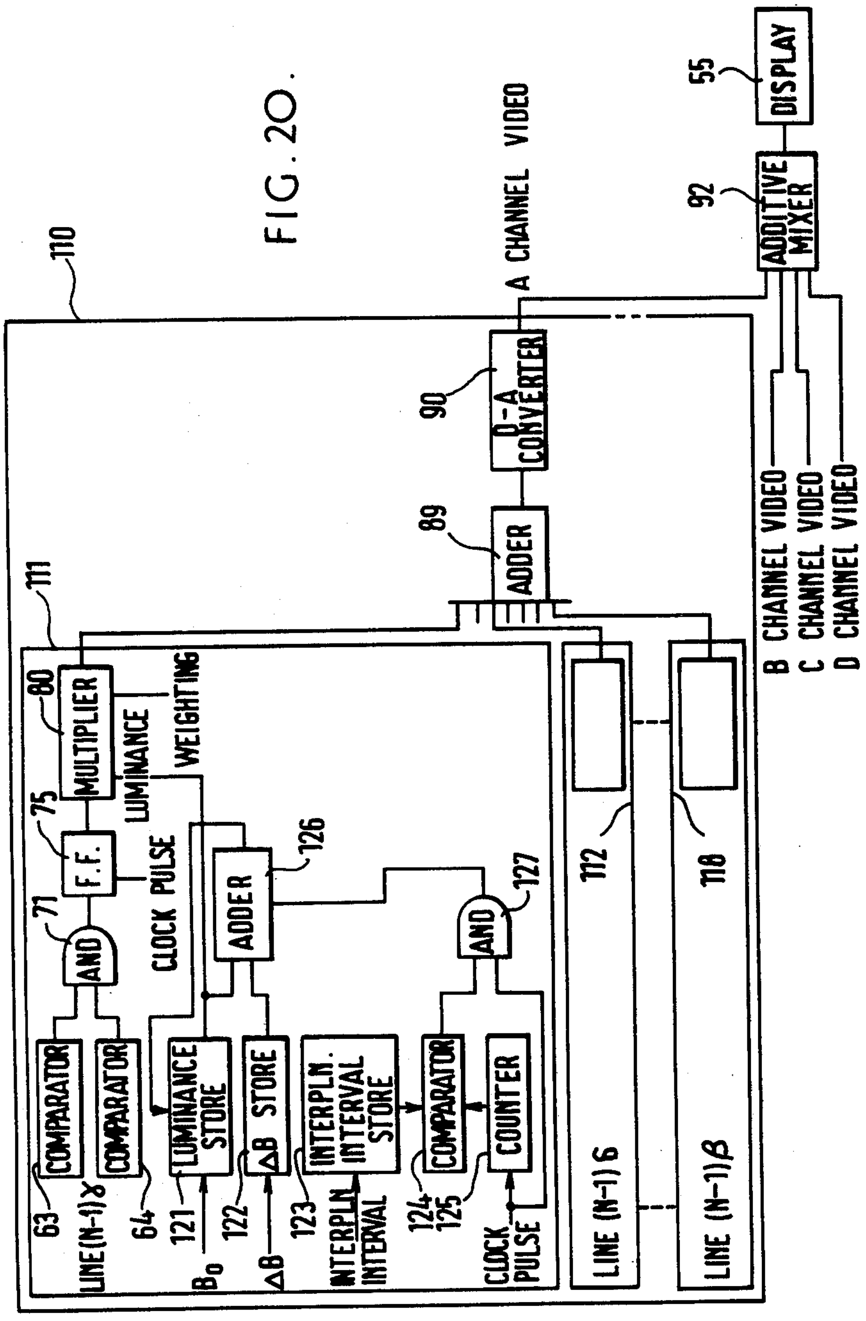

FIG. 20 is a block schematic diagram of apparatus according to the invention for displaying line segments with improved luminance contour due to the use of a triangular hold.

In known raster-scan display systems for computer-generated information, each active raster-scan line period is divided into a number of discrete, consecutive, time intervals. The video level can be changed only at the start of each time interval, thus effectively dividing the display screen area convered by one raster-scan line into a number of contiguous elemental areas as illustrated in FIG. 1.

In FIG. 1, a single scan line 10, scanning across the face of a C.R.T. in the direction of line 11, is shown as made up of a succession of discrete, contiguous elemental areas, of which the first seven elements are referenced 1 to 7.

The use of a practical display device such as a television monitor will slightly modify the effect of these elemental areas since, as the energy distribution across the light spot tracing out the scan line is not uniform, and the light spot diameter may be larger, or smaller, than the elemental area height, or width, it is not possible to produce an elemental area on the display with uniform light output along and across the area, or with abrupt edges. If the light spot size is approximately circular and of diameter comparable to the height of the elemental area shown, then the elemental areas may conveniently be drawn as rectangular areas.

The resultant display then has a maximum resolution capability of a single elemental area, but the image position must be approximated to the nearest elemental area. Thus, the elemental areas addressed to display a computer-generated, near-vertical boundary on an horizontally scanned raster-scan display, will be as shown in FIG. 2.

Figure 2:
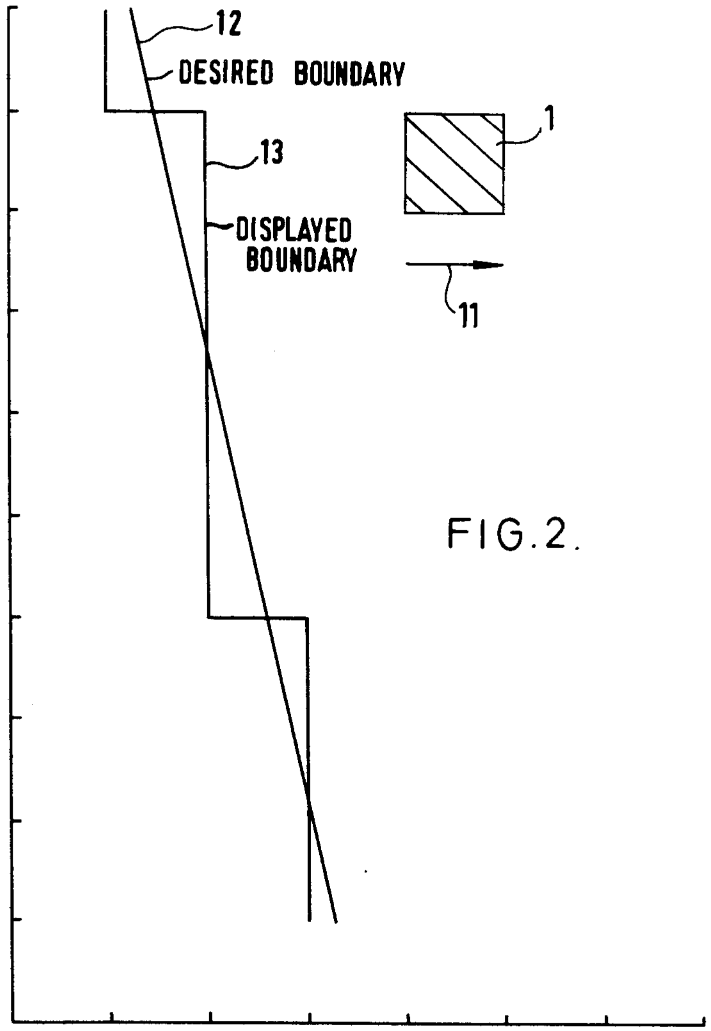
FIG. 2 is a diagram showing an inclined, true boundary line and the step-wise inclined boundary produced by elemental areas in accordance with the known CGT technique, a singal elemental area being shown separately for reference.

In FIG. 2, a single elemental area, according to FIG. 1, is shown in the cross-hatched area 1, for reference. The line beam direction is shown by the arrow 11, as in FIG. 1. A true inclined boundary line, which it is desired to display, is shown at 12. The actual stepwise inclined boundary line provided by the known dispaly is shown at 13.

If a circular light spot is used to trace out the image having boundary line 13, the stair step corners will be rounded, but the stair steps will remain.

The effect of the stair steps can be reduced by computing an intermediate level of luminance and chrominance where the required boundary does not exactly intersect the centre of an elemental area. This measure reduces the effects of the stair steps where the the video level is constant over several elements either side of the intersecton, but is does not help where a line approximately one element wide it to be displayed at an angle to the scan lines. Such a case is shown in FIG. 3

Figure 3:
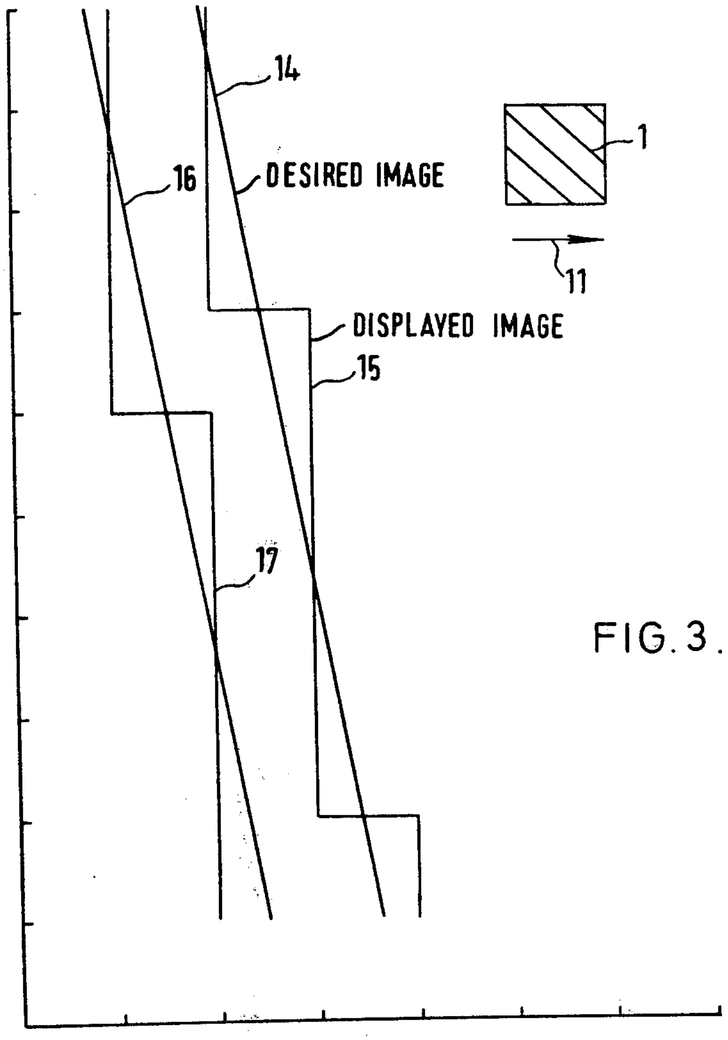
FIG. 3 is a diagram, of similar form to FIG. 2, showing the result of displaying a line approximately one picture element wide inclined with respect to the scan lines, in accordance with known CGI technique.

In FIG. 3, a single elemental area is reproduced at 1, and the scan direction shown by the arrow 11, as in FIG. 2. A first, inclined, true boundary line is shown at 14 and the corresponding actually-displayed stepwise inclined boundary line is shown at 15. A second, inclined, true boundary line is shown at 16, displaced leftwards with respect to line 14. The actually-displayed stepwise inclined line, corresponding to line 16 is shown at 17.

From FIG. 3, it can be seen that the width of the displayed line 15, 17 is not constant for all raster lines, and the positions of these variations move up or down the displayed line as it is moved across the screen.

This effect can be quantitively reduced by increasing the number of raster lines and the elements per line, or by merely increasing the number of elements per line, without reducing the minimum size object which may be displayed. The first method means that a higher resolution display device is being used to hide deficiences, and the display still cannot be utilised to its full capabilities. The second method requires a higher video bandwidth than is usual for a given line standard, thus removing the ability to use a standard television display as the viewing device.

In apparatus according to the present invention, an improvement is effected in that each raster line is quantised into a number of sets of elements, and each contiguous set is displaced by a fraction of a time element with respect to the line start. The relative timings of four such sets for one line is shown in FIG. 4, the sense of increasing time being shown by the arrow "*t.*"

Figure 4:
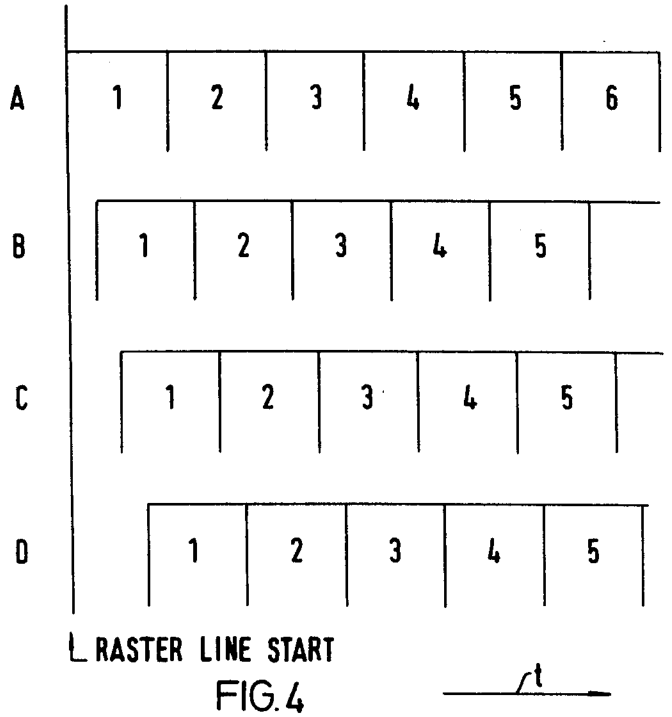
FIG. 4 is a timing diagram showing the displaced relative timing of the sets of elements in apparatus according to the present invention.

In FIG. 4 are shown four such relatively displaced sets of elements, referenced A, B, C and D, each set comprising contiguous elements of which six elements, referenced 1 to 6, are shown for each set. Within each set, the video level can be changed only at the transition points marked by a vertical line.

A video signal is generated separately for each such set of displaced contiguous elemental areas. The signals of all sets are mixed, either non-additively, to give precise positioning only, or additively, to give the effect of a precisely positioned spot or boundary scanned by an aperture, before the resultant signal is supplied to the display tube.

Figure 5:
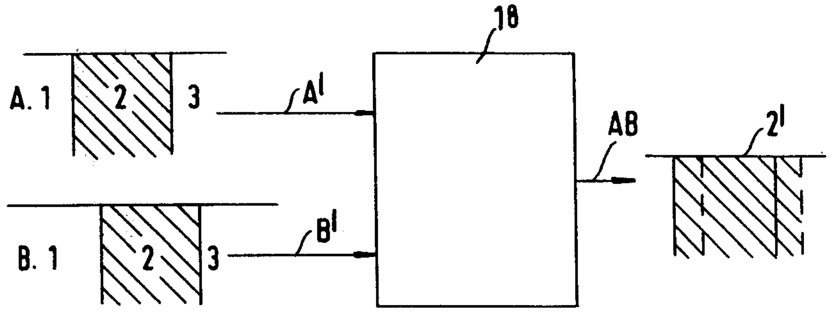
FIG. 5 is a diagram showing the principle of signal mixing used in apparatus of the present invention.

FIG. 5 shows, diagrammatically the mixing process for two, consecutive, such elemental sets. The minimum size elemental area which can be displayed is still a single elemental area, such as area 2. However, assuming that the original area is of such length that both elements 2 of consecutive sets A and B both represent a high video level, as is represented by the cross-hatched area of each, the resultant displayed image is $1\frac{1}{4}$ elements in length, as showed by the displayed image 2′ of FIG. 5.

To achieve this result, the video signal of set A and the corresponding signal of set B are fed, as shown by arrows A′ and B′ into a non-additive mixer 18, which provides an output signal AB which, at any instant, is equal to the greater instantaneous value of signal A and signal B.

Thus, an image boundary displayed may start at any transition, and finish at any transition more than one elemental area away, thus giving an improvement in positioning and size, compared with the known systems described above. This improvement is obtained without increasing the video band width requirements, by the addition of parallel channels having the same video bandwidth as the present systems.

and is combined with the line comparator 31 output in AND gate 36 to enable the digital-to-analogue converter 40 to convert the appropriate luminance signal. Similarly, the outputs of start 65 and finish 66 comparators are combined in AND gate 72, to produce an input signal to a flip flop 76, which is gated by clock pulse B. The output of flip flop 76 is combined with the line comparator output in AND gate 37 and used to enable the digital-to-analogue converter 41, to convert the luminance signal.

Similar paths for the other clock pulses are through comparators 67 and 68, AND gate 73, flip flop 77, and AND gate 38 to digital-to-analogue converter 42, and comparators 69 and 70, AND gate 74, flip flop 78 and AND gate 39 to digital-to-analogue converter 43. The outputs of the four digital-to-analogue converters 40, 41, 42 and 43 are synchronous with clock pulses A, B, C and D and hence have the same relative timings. They are combined in a non-additive mixer 52 to produce a video signal, which may start and finish at any one of the quarter element positions on the display 55, provided only that the start and finish are at least one element apart. The next line segment data may then be read from the display list and the process repeated. Additional colour video signals may be produced by adding extra circuitry in a similar manner to that already described for points of light.

Figure 10:
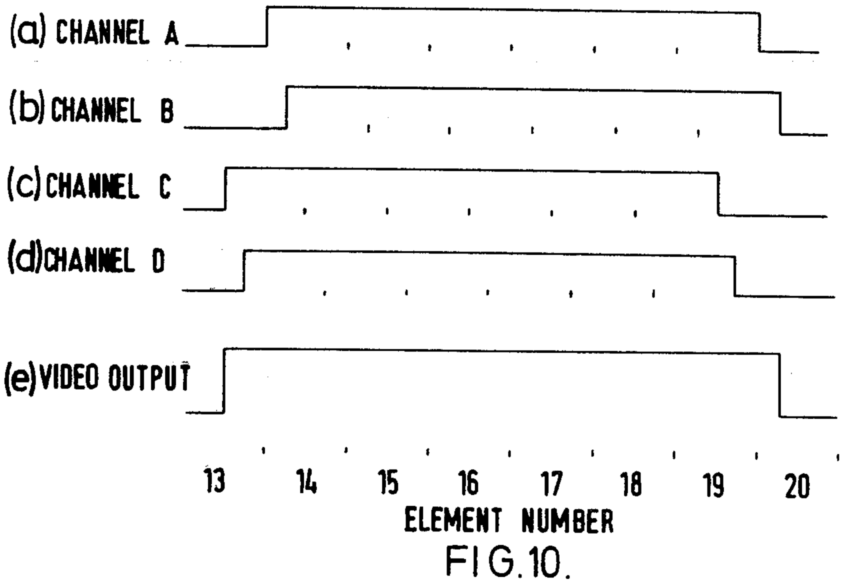
FIG. 10 shows digital-to-analogue converter enable signals, and the final video output which may be obtained from a system as shown in FIG. 9.

FIG. 10 shows the digital-to-analogue enable signals obtained from each channel and the resultant video signal for a particular example of a line segment starting at element $13\frac{1}{2}$ finishing at $20\frac{1}{4}$, i.e. having a length of $6\frac{3}{4}$ elements. The segment start address, $13\frac{1}{2}$, will be supplied to the segment start comparators 63, 65, 67 and 69. The current element counters 25, 26, 27 and 28 are pre-set to 0, $\frac{1}{4}$, $\frac{1}{2}$ and $\frac{3}{4}$ from the look-up table 23 at the line start synch pulse and then increment in integers. Channel C comparator 67 produces an equivalence output at element $13\frac{1}{2}$ and current line count greater than the segment start from element $14\frac{1}{2}$. The segment finish address is supplied to the segment finish comparators 64, 66, 68 and 70 where, on channel C, it will produce an output for current element count less than segment finish address until element $19\frac{1}{2}$. The two comparator outputs for channel C are fed into AND gate 73 to produce a signal defined by start address $\leqq$ current element count $<$ finish address, which is clocked into flip flop 77 by clock pulse C. This is combined with the line equivalence signal from the line comparator 31 to produce the digital-to-analogue converter enable signal shown as channel C at FIG. 10(*c*).

Similar processes apply to the other channel to produce the digital-to-analogue enable signals shown in FIG. 10 at (*a*), (*b*) and (*d*). These will each enable conversion of the luminance signal for the line segment for the periods of time shown, and the result of a non-additive mix of these video signals will result in the video signal shown in FIG. 10(*e*), where the amplitude is determined by the computed luminance value and where the start and finish are determined by the earliest and latest channel enable pulses generated by the control logic, thus giving more precise start and finish of line segments than in known systems.

Figure 11:
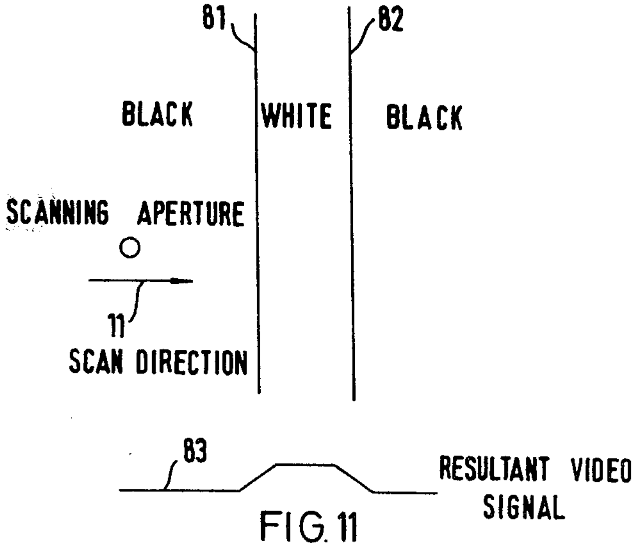
FIG. 11 shows the type of video signal which will be obtained from an analogue device such as a television camera when an aperture scans across a sharp transition from, say, black to white.

FIG. 11 shows the effect on the video signal of the scanning aperture in a television camera. The scanning beam in a television camera will typically have a circularly symmetrical Gaussian distribution. When this spot scans across a sharp transition 81 from, say, black to white, the resulting signal 83 will have edges with rise time, and fall time for transition 82, determined by the aperture width, in the direction of the scan, and the scanning speed of the spot across the image. In addition, the size of the Gaussian distribution of the scanning aperture is such that the skirts of the distribution will produce a small but significant video signal from the images formed on the adjacent scan lines. Thus a bright point image falling on scan line "$n$" in a television camera will result in a large video output on scan line "$n$" and smaller video outputs on lines "$n-1$" and "$n+1$." The relative amplitude on the adjacent lines will be dependent upon the distance of the image position from each scan line centre. A bright image spot moving slowly across the camera scan lines will therefore transfer smoothly from scan line to scan line.

This smooth transition of an image across the face of a television display has been synthesised in known CGI systems by computing the image position to a higher degree of accuracy than the display elemental resolution and by taking the weighted sum of these higher resolution points for the assumed aperture around each elemental area, from the signal set of contiguous elemental area forming the display, in turn.

Applying the multi-channel system allows the weighted sum of the video to be produced for each addresable element on the display, where the number of addressable elements is the number of channels multiplied by the number of elements in the basic contiguous set. When applying the multi-channel system to the synthesis of a scanning aperture, the space between adjacent scan lines on the display device may, for computational purposes, be divided into a number, "$m$," of sub-lines, and the position of a light spot or edge computed to the nearest sub-line, and also to the nearest channel element along the subline, as already described. Thus, if equal horizontal and vertical resolution is required, each elemental area of the display is effectively divided into $m^2$ regions. If the images falling on each of the sub-lines forming the scan line, "$n$," being written onto the display device and the adjacent lines "$n-1$" and "$n+1$" are made available simultaneously, the effect of the shape of the scanning aperture on adjacent scan lines in a television camera may be produced by summing, with suitable weighting, the sub-lines forming lines "$n-1$," "$n$" and "$n+1$", on a channel basis to form "$m$" channels of video for scan line "$n$." The effect of the shape of the scanning aperture moving along the scan line in a television camera may now be approximated by summing the "$m$" channels "$m$" overlapping elements at a time in a continuous manner and dividing the result by "$m$." This may be achieved by replacing the non-additive mixer for the several channels already described by an additive mixer, and rescaling the resultant signal to produce the average value.

This process will now be described, as it is here applied to a system having four element channels along each scan line, as already described. For equal horizontal and vertical resolution, the space occupied by each scan line on the display must be divided into four sub-lines. This is illustrated in FIG. 12, which also shows a computed edge having a transition from, say, black to white at scan line $(n-1)$, sub-line $\gamma$, element 2A. Similar transitions occur across the display at $(n-1)$, $\beta$ 2D; $n$, $\alpha$, 3C; etc.

The assumed Gaussian distribution of the scanning aperture is shown at 84 in FIG. 12, together with an approximation 85, which may be used as a weighting function for adjacent scan lines. As shown, the aperture In FIG. 6, the inclined, straight, original boundary lines 14 and 16 of FIG. 3 are reproduced and may here be regarded as the two boundary lines of an inclined area approximately one elemental area in width.

Figure 6:
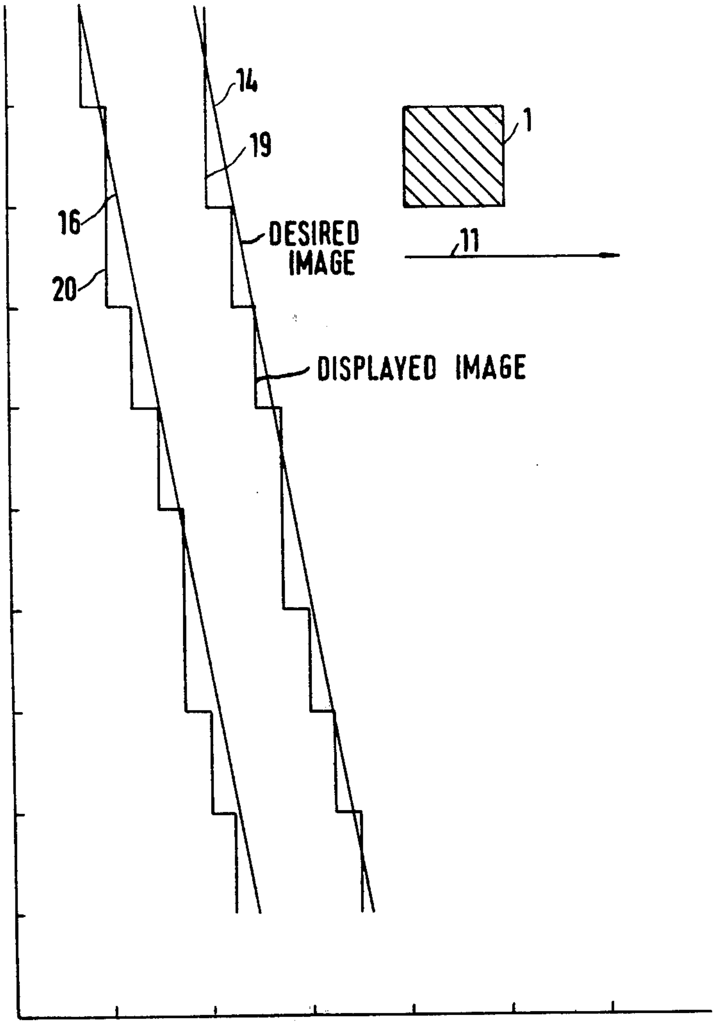
FIG. 6 is a diagram, of similar form to those of FIGS. 2 and 3, showing the modified inclined boundary and the more constant line thickness of a display produced by apparatus of the invention.

In FIG. 6, the display shown still exhibits stair steps, but these are reduced in size and hence the variation in image size is reduced.

Figure 7A:
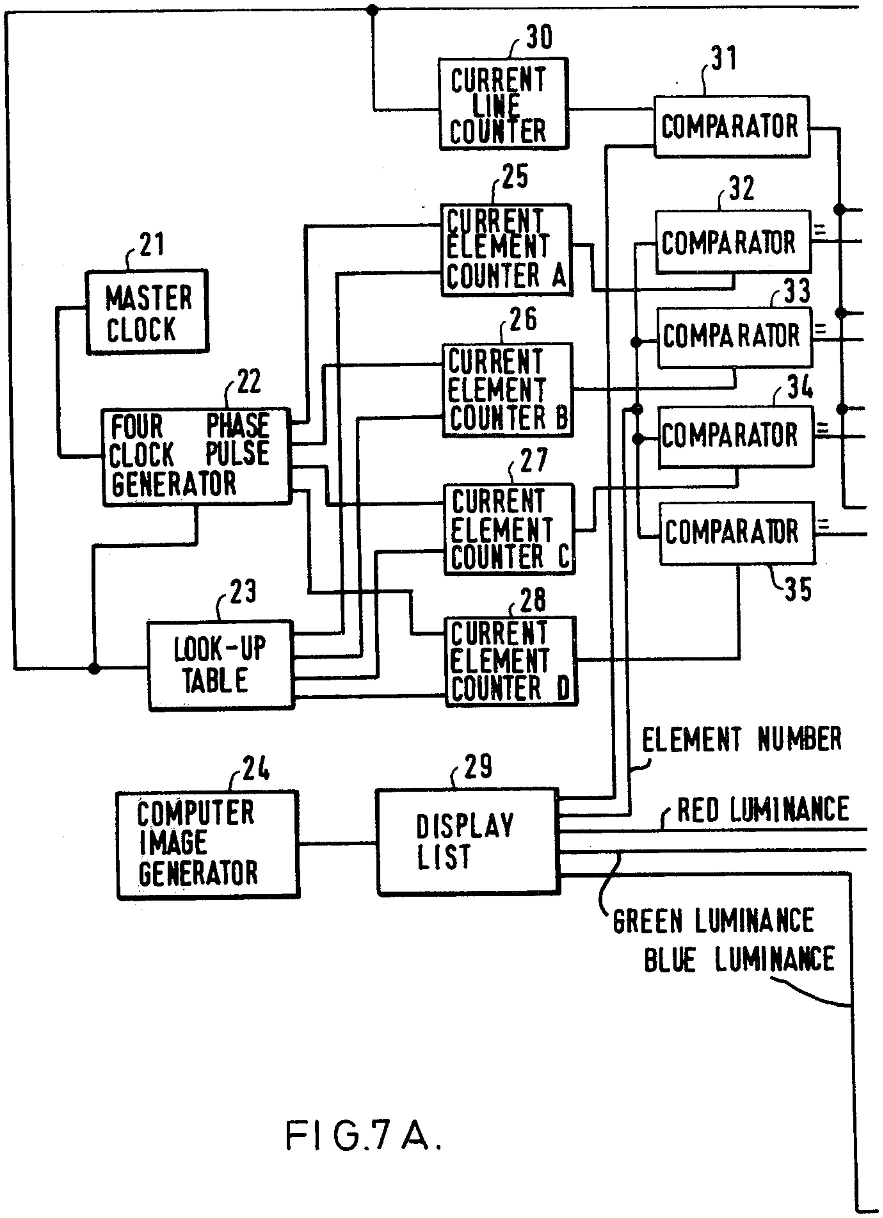
FIGS. 7A and 7B are a block diagram of apparatus according to one form of the invention, for displaying light points.
Figure 7B:
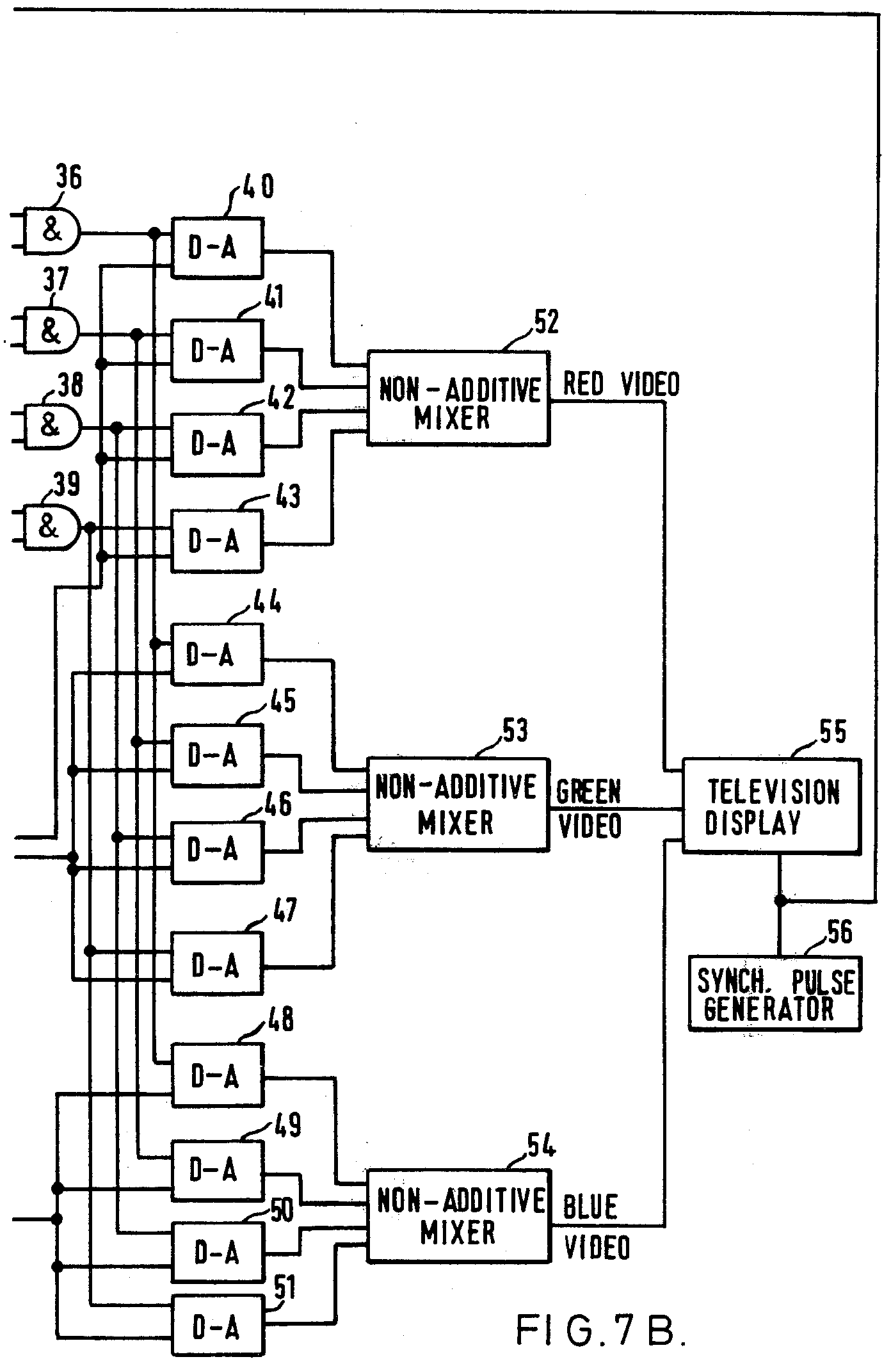

FIG. 7 is a block schematic diagram of apparatus according to one form of the invention, using four channels with non-additive mixing to produce the red, green and blue video signals, for displaying points of light on a television monitor display.

The light positions and colour components are computed and sorted into the correct sequence for display, using a computer 24, and the data is supplied to a display list unit 29. Each data point is stored in the display list unit, defined as the line number, the element number (expressed in fractional form to the nearest quarter element) and the red, green and blue luminance values.

A master clock 21, running at four times the elemental rate, is used to drive a four-phase clock, pulse generator 22, which has four time-displaced clock pulse outputs, each clocking at the elemental rate, but relatively displaced one quarter of the elemental clock period from adjacent clock pulses. A television synch pulse generator 56 is used to synchronise a clock pulse A, supplied to current element counter A25, to the start of the television scan line on the televison monitor 55.

Known practice is to use one clock pulse generator to derive all timing and synchronisation pulses. Separate clock and synchronisation pulse generators 21 and 56, respectively, are used in the apparatus described above, to permit the apparatus to be interfaced to a standard television system. The same synch pulse is used to preset, using look up table 23, the current element counters 25, 26, 27, 28 to 0, $\frac{1}{4}$, $\frac{1}{2}$, $\frac{3}{4}$, respectively. These counters will then be clocked in turn by one of the four-phase clock pulses, to increment each counter by 1. The synch pulse generator also synchronises the current line counter to the television display.

The data for the first light point is read from the display list 29. The line number is supplied to the line comparator 31, where equivalence with the current line counter 30 provides one input to the AND gates 36, 37, 38 and 39. The element number is supplied to the four element comparators 32, 33, 34, and 35, where equivalence with one current element counter 25, 26, 27 or 28, will supply a signal to one of the AND gates 36, 37, 38 or 39. When equivalence occurs for both line and an element, one AND gate output will enable a group of digital-to-analogue converters which have been supplied with the red, green and blue luminance values to produce the red, green and blue video signals for the display. Equivalence in line comparator 31 and current element A comparator 32 will enable digital-to-analogue converters 40, 44 and 48. Similarly equivalence in line comparator 31 and current element B comparator 33 will enable digital-to-analogue converters 41, 45 and 49, equivalence in line comparator 31 and current element C comparator 34 will enable digital-to-analogue converters 42, 46 and 50, and equivalence in line comparator 31 and current element D comparator 35 will enable digital-to-analogue converters 43, 47 and 51.

The four possible video output signals for each colour are non-additively mixed in mixers 52, 53 and 54, before being supplied to the television display 55. The next light point data is then read from the display list and treated in the same manner as described for the first light point. In this way, a complete pattern of light points may be displayed on the television monitor 55.

Figure 8:
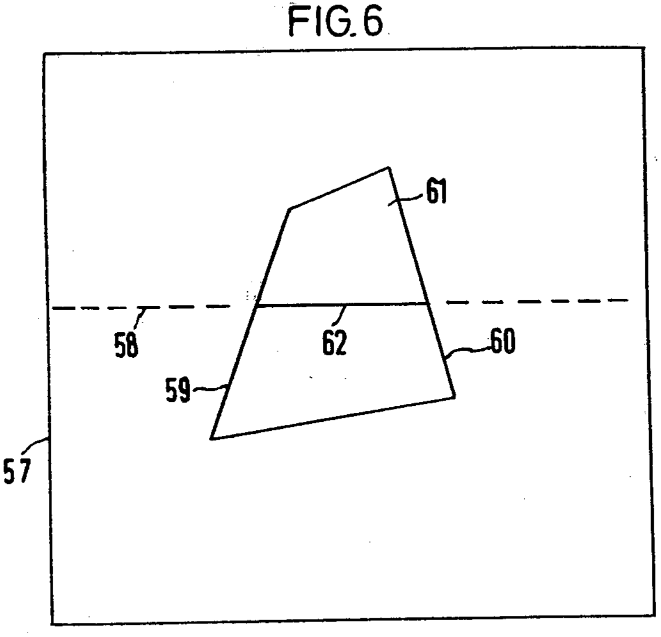
FIG. 8 is an illustration of a line segment.

The above system may be extended to draw surface areas. FIG. 8 shows a surface area 61 at the instant it is being crossed by a scan line 58 of a television raster progressively scanning the area enclosed within the rectangular boundary 57. The television scan line intersects with the boundary lines 59, 60 of the surface area 61, to form a display line segment 62. The line segment 62 may be defined at the beginning of the scan line, but will not become active until the first boundary line 59 is reached. If such segments are defined for a number of consecutive scan lines, the surface area 61 is then defined.

Figure 9A:
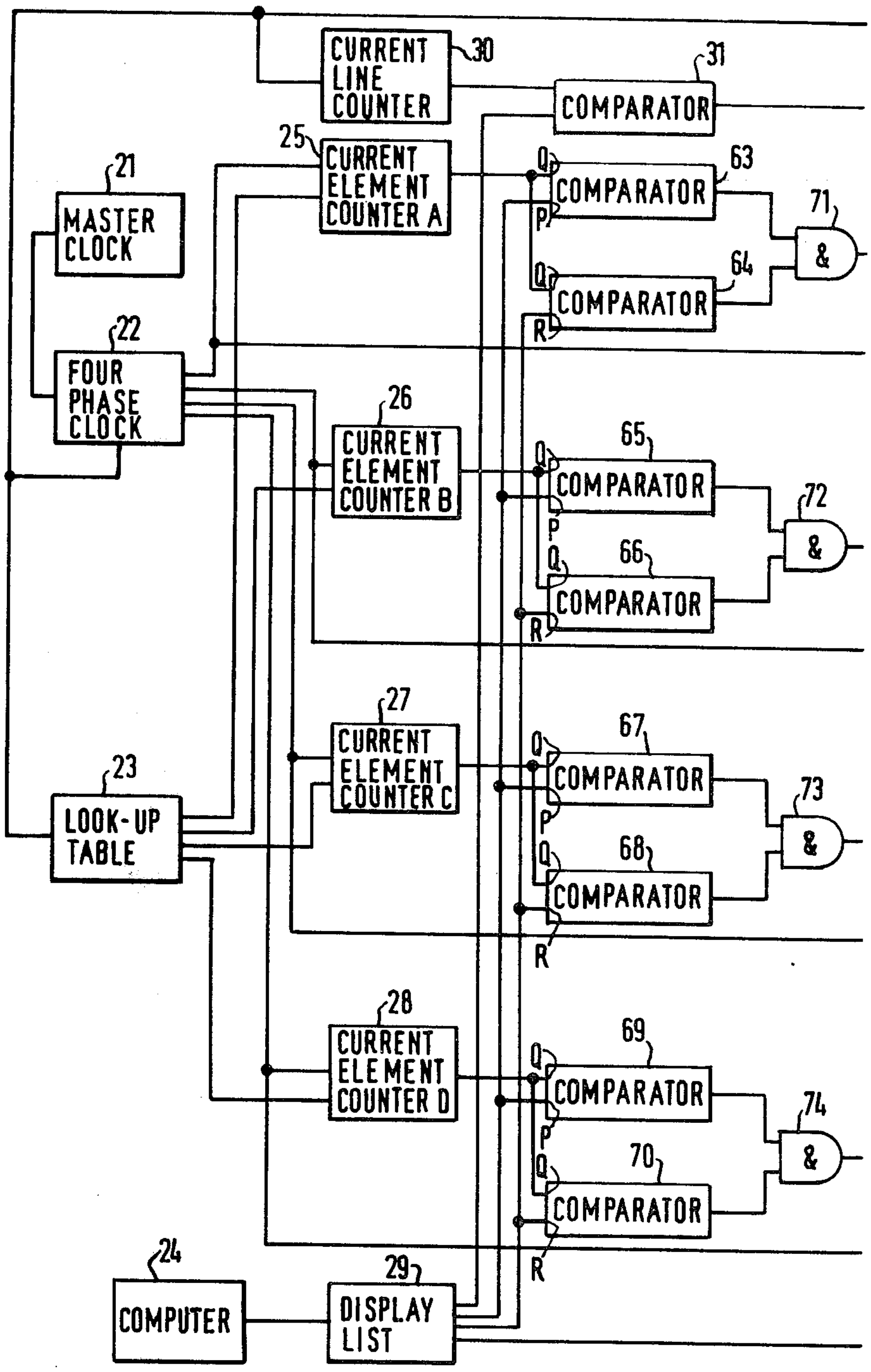
FIGS. 9A and 9B are a block schematic diagram of apparatus according to the invention for displaying areas formed from line segments.
Figure 9B:
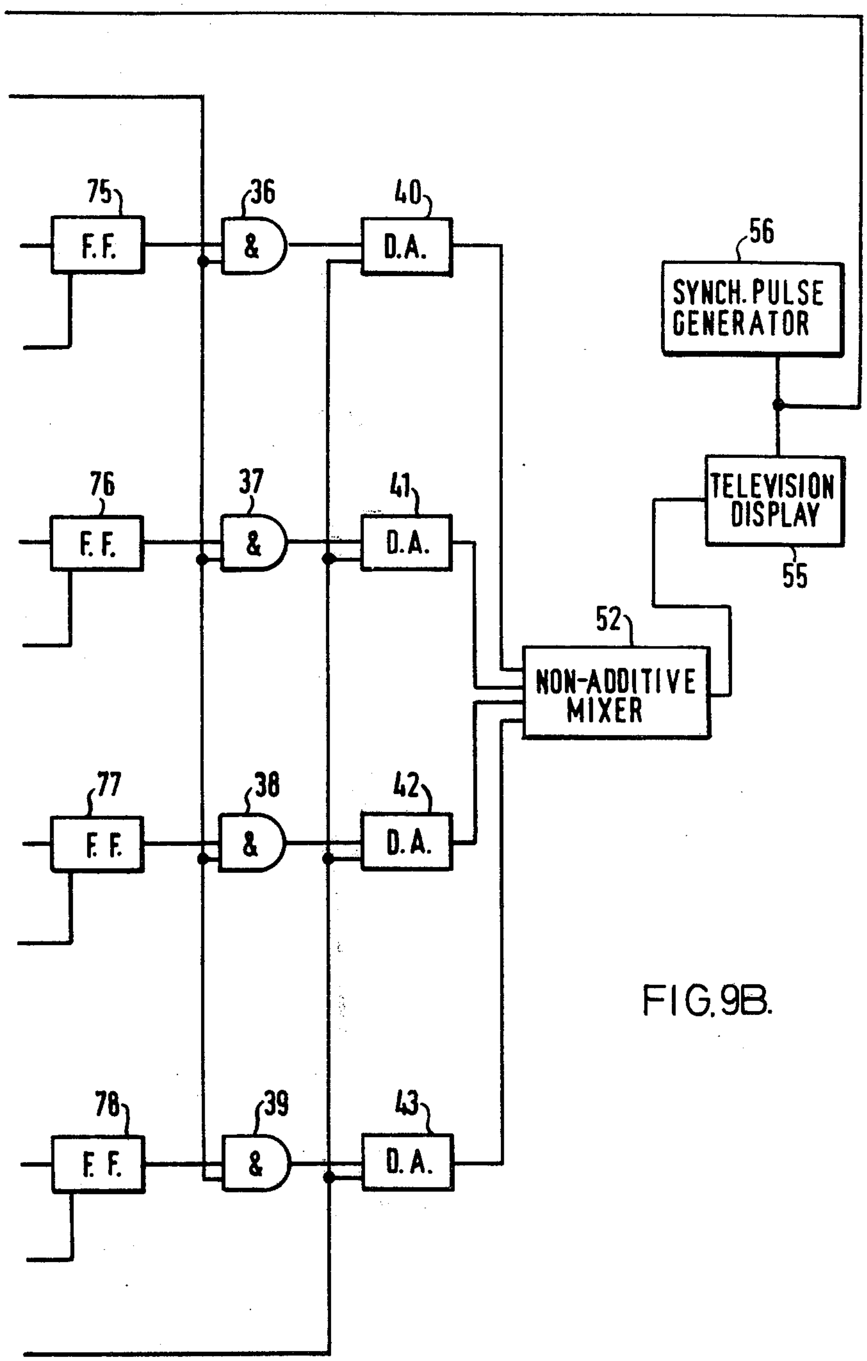

FIG. 9 is a block schematic diagram of apparatus according to a further embodiment of the invention, using four channels with non-additive mixing to produce a single colour video signal to display line segments on a television monitor. The apparatus of FIG. 9 is to be compared with the apparatus of FIG. 7 and corresponding elements are indicated by the same reference numerals in the two figures.

In the apparatus of FIG. 9 the line segments are computed and sorted into the correct sequence for display using a computer 24. The data is supplied to a display list 29, where each line segment to be displayed is stored, defined as the line number, the start address and the finish address (each expressed in fractional form, to the nearest quarter element) and the red, green and blue luminance values.

A master clock 21, running at four times the elemental rate is used to drive a four-phase clock pulse generator 22, which has four time-displaced clock pulse outputs, each clocking at the elemental rate, but displaced one quarter of the elemental clock period from adjacent clock pulses. A television synch pulse generator 56 is used to synchronize clock pulse A, supplied to current element counter A25, to the start of the television scan line on the television monitor 55. The same synch pulse is used to pre-set (using a look-up table 23) the current element counters 25, 26, 27 and 28, to 0, $\frac{1}{4}$, $\frac{1}{2}$ and $\frac{3}{4}$, respectively. These counters are then clocked in turn by one of the four-phase clock pulses to increment each counter by one, in turn. The synch pulse generator 56 also synchronises the current line counter 30 to the display.

The data for the first line segment to be displayed is read from the display list 29. The line number is supplied to the line comparator 31 which, on equivalence with the current line counter, will give an input to AND gates 36, 37, 38 and 39. The segment start address P is supplied to the segment start comparators 63, 65, 67 and 69, where it is compared with the four current element counter 25, 26, 27 and 28 outputs. Each said comparator gives an output when the current element count Q is greater than the start address P. The segment finish address R is supplied to the segment finish comparators 64, 66, 68 and 70, where it is compared with the four current element counter 25, 26, 27 and 28 outputs. Each said comparator gives an output when the current element counter output Q is less than the start address R.

The start 63 and finish 64 comparator outputs are input to an AND gate 71 to produce $P \leqq Q < R$, which is input to the flip flop 75 and clocked in with a four-phase clock pulse A output. The output of the flip flop 75 will be high for a whole number of clock pulses A, distribution is assumed to cover only half of the adjacent scan lines. It may, of course, be adjusted in size, shape and amplitude by adjusting the magnitude and number of the weighting coefficients applied to each of the available sub-lines. As shown, the aperture distribution is symmetrical and is formed from weights 1 to 4. The four channel video for line "$n$" is formed by performing the following summations for each element of the line:

$$A_p = \sum_{p=0}^{P_{MAX}} W_4 \cdot V_{(n-1),\gamma,p} + W_3 \cdot V_{(n-1),\delta p} + W_2 \cdot V_{n,\alpha,p} + W_1 \cdot V_{n,\beta,p} + W_1 \cdot V_{n,\gamma,p} + W_2 \cdot V_{n,\delta,p} + W_3 \cdot V_{(n+1),\alpha,p} + W_4 \cdot V_{(n+1)\beta,p}$$

where:

$A_p$ is the amplitude of the video signal for channel;
$P_{MAX}$ is the total number of elements per channel;
$p$ is the actual element number being computed;
$\alpha$ to $\gamma$ are the sub-lines within a line;
$n$ is the line to be displayed;
$(n-1)$ and $(n+1)$ are the lines immediately adjacent to line on the display;
$W_1$ to $W_4$ are the weighting values used; and
$V_n, \alpha,_p$ is the computed video signal for line $n$, subline $\alpha$, element $p$.

Identical summations are performed for the other three channels to form $B_p$, $C_p$, $D_p$ for $0<P\leqq p_{max}$. The results of these summations applied to the computed video shown in FIG. 12 is shown in FIG. 13 as channels A, B, C and D.

These four elemental values can then be combined by adding four adjacent elemental channels in an additive mixer, a typical summation being:

$$V_o = B_p + C_p + D_p + A_{(p+1)}$$

followed by:

$$V_o = C_p + D_p + A_{(p+1)} + B_{(p+1)}$$

$$V_o = D_p + A_{(p+1)} + B_{(p+1)} + C_{(p+1)}$$

and so on, where $V_o$ is four times the average value and can be rescaled to $V_o/4$ before being fed to the display device.

FIG. 14 shows the individual channel video signals obtained by performing the summations for $A_p$, $B_p$, $C_p$ and $D_p$ for the case shown in FIG. 13, together with the resultant $V_o$ obtained by adding the elemental values four at a time.

An embodiment of the invention including the synthesis of television aperture effects, is shown in FIG. 14. The line segments to be displayed are computed and sorted into the correct sequence for display, as before in the apparatus of FIG. 7, and stored in separate display lists for scan lines $(n-1)$, $n$, and $(n+1)$ on the display. A master clock 21 is used, as before, to generate four elemental clock pulses and current element counts. The display list for scan line $(n-1)$ is read and the segment start and finish address supplied to all the line $(n-1)$ segment comparators, of which two, referenced 63 and 64, only are shown.

The comparator outputs are input to an AND gate 71 and stored in a flip flop 75, the output of which is a control logic input to a multiplier which multiplies the luminance signal by the weighting function. The apparatus from segment comparators 63, 64, to the multiplier 80 output is shown enclosed in box 81, which is repeated as blocks 82 to 88 for the other sub-lines of line $(n-1)$, $n$, and $(n+1)$. The outputs from all these boxes 81 to 88 are the weighted luminance values which are summed in an adder 89 to produce the weighted sum for channel A, which is converted by a digital-to-analogue converter 90, using clock pulse A as an enable signal. The complete system apparatus, up to the digital-to-analogue converter 90 is shown enclosed in a box 91. This apparatus is repeated, with the appropriate clock pulses, for channels B, C and D. The output of each of these systems is video at the elemental rate and the four video signals are summed in an analogue video mixer 92 to produce four times the average value for any four overlapping elements, which is fed to display 55. If three colour video is required, the system apparatus prior to the display is repeated for each additional colour.

FIG. 12 shows how, in a computer generated imagery (C.G.I.) system, an oblique edge may be represented, using four sub-lines per scan line, where the edge is tilted with respect to the scan lines so that the line segment start points on adjacent sub-lines are within the scanning aperture simultaneously. If this edge is rotated to reduce the angle between the edge and the scan lines, the spacing between line segment starts (or finishes) on adjacent sub-lines increases, so that the spacing is large compared with the scanning aperture and there is no longer a smooth change in video level along a scan line intersecting the edge.

If, according to a further aspect of the present invention, a triangular hold is introduced between line segment start positions on adjacent sub-lines, then linear interpolation of the luminance will be obtained between line segment start positions on adjacent sub-lines which, when scanned by an aperture, will produce a close approximation to the video signal obtained by scanning an image of a physical model.

FIG. 15 is an isometric diagram which relates to an analogue display system and wherein the solids generated are related to the orthogonal axes shown at the head of the drawing and represented: Scan direction II, Scan lines 93 and Luminance 95.

There is shown in FIG. 15, the outline 100 of a typical image extending in length less than the length of each line of scan and extending in length more than the width of two adjacent scan lines.

Four adjacent scan lines 101, 102, 103 and 104 are shown; the line 101 carrying no part of the image 100 but each of lines 102 to 104 carrying some part.

As shown, the lengthwise direction of the image 100 edge is slightly oblique to the scan lines 101 to 104.

A Gaussian scanning aperture, typical of the electron beam intensity in transverse cross-section of the scanning beam in an analogue system, is represented in its solid isometric form, which would be a solid hump pointing upwardly in the direction of Luminance 95, it is shown in FIG. 15 as the section 84 transverse of the scanning line 101, the section 84' longitudinal of the scanning line 101 and the base circle 84''. It will, however, be realised that the scanning aperture is truly represented as a solid figure, of which the plane figures 84, 84' and 84'' are section.

The scanning aperture 84 moves along scan line 101 in the scan direction II and next moves along scan line 102 in the same scan direction in a sequential scan system, or along scan line 103 in the same scan direction in an interlaced scan system.

Due to the width of the skirt of the Gaussian scanning aperture 84, the skirt fringe 84″ just touches the image 100 edge in the scanning of line 101, as is shown in the diagram by the dash-line 84‴.

FIG. 16 is an isometric diagram showing the video signals generated, for example by a television camera, by the scanning process of FIG. 15. The solids generated are related to the orthogonal axes shown: Scan direction II, Scan lines 93 and Video signal amplitude 97. The video signal generated in the line 101 scan is zero, as shown at 101′. The pattern of the image 100 of FIG. 15 is built up, in the scanning of the adjacent lines 102, 103 and 104 by the solids 102′, 103′ and 104′, respectively, together approximating the rectangular solid 100.

The isometric diagram of FIG. 17 shows, in the solid figure 100′ the form in which the image 100 of FIG. 15 is modelled in a C.G.I. system with four sub-lines per line and four sets of elements per line, with the addition of a triangular hold.

Adjacent scan lines 101 to 104 are shown, as in FIGS. 15 and 16. The luminance interpolation is specified to eight binary digits, in this example. The quantization steps are thus small as the interpolation interval increases, with decrease of the angle of inclination.

The equivalent scanning aperture is shown at 84. The Gaussian distribution, in the section transverse of the scan line of FIG. 15, is approximated stepwise, but the Gaussian distribution of the section 84′ is not approximated, the section being rectangular in the direction of line scan II.

The resultant video signals provided by scanning the figure 100′ of FIG. 17 with the scanning aperture 84 of FIG. 17 is shown in FIG. 18. The solids generated are related to the axes: Scan direction II, Scan lines 93 and Video signal amplitude 97, as in FIG. 16.

Scanning of line 101 produces no signal. The scanning of lines 102, 103 and 104 produces the signals represented by the solid figures 102′, 103′ and 104′ respectively.

FIG. 19 shows an image boundary inclined with respect to the scan lines having a vertex on line (N−1) at $X_1$ with luminance $B_1$, and intersecting with the succeeding scan lines with luminance $B_2$ at $X_2$ on line N, $B_3$ at $X_3$ on line N+1, etc.

FIG. 19(*a*) shows the case for $X_1 < X_2$, where the interpolation on line N is from $B=0$ at $X_1$ to $B=B_2$ at $X_2$. The elemental increment is then given as:

$$\Delta B = B_2/(X_2 - X_1)$$

FIG. 19(*b*) shows the case for $X_1 > X_2$, where the interpolation on line N is from $B=B_2$ at $X_2$ to $B=0$ at $X_1$. The elemental increment is then given as:

$$\Delta B = B_2/(X_2 - X_1)$$

and will always be negative.

FIG. 19(*c*) shows the case for $X_1 = X_2$, i.e. the image boundary is perpendicular to the scan lines. The luminance value for line N is then $B=B_2$ at $X_2$ and no interpolation is required.

These equations can be implemented using a four phase clock. In this case, four luminance stores are required, one for each channel, for each sub-line. The channel store coincident with the start address will be loaded with the initial luminance value $B_o$, the other channel stores loaded with $(B_o + \Delta B/4)$, $(B_o = \Delta B/2)$, $(B_o + 3\Delta B/4)$ at their respective clock pulses, and each incremented with the signed increment $\Delta B$ at the appropriate clock pulse, until the interpolation interval is complete. The luminance values so obtained for each channel are the luminance input to the multiplier 80 shown at 81, for one channel of one sub-line in FIG. 14.

FIG. 20, which is to be compared with FIG. 14 and in which corresponding elements are indicated by the same reference numerals, shows a visual display system providing a colour display in four channels A to D as in the arrangement of FIG. 14. The video signals to channels A to D are provided by four corresponding units referenced 110 for A channel video, the three other input lines for B to D channel video being shown below in FIG. 20. All four channels supply video signals to the additive mixer 92, the output signal being displayed on the display monitor 55, generally as in FIG. 14.

Considering next, unit 110 of A channel video, eight similar units 111 to 118, of which unit 111 is shown in detail and units 112 and 118 are shown as blocks, all feed signals into the adder 89, the summed signal from which is converted into analogue form by the digital-to-analogue converter 90, again generally as shown in FIG. 14.

The difference in circuitry between the arrangements of FIG. 20 and FIG. 14 is found in the circuitry of the units 111 to 118.

As for the arrangement of FIG. 14, the line segment length, in the arrangement of FIG. 20, is determined by the comparators 63 and 64, AND gate 71 and flip-flop 75. The weight is multiplied by the appropriate luminance value by the multiplier 80 for each sub-line.

In this embodiment, the luminance value for each subline is differently computed, as follows: The initial luminance value $B_o$ is stored by a luminance store 121 at the start of each sub-line segment. The luminance increment ΔB is similarly stored by the incremental luminance value store 122. An interpolation interval store 123 and a counter 125 are initially cleared. Each clock pulse supplied to counter 125 is counted and the value compared with the interpolation interval input to store 123 by a comparator 124. The comparator 124 output and the clock pulse input are combined in an AND gate 127 to control an adder 126. The adder 126 adds the luminance increment from store 122 to the initial luminance from store 121 and supplies the sum value as input to the multiplier 80.

Each of the units 112 to 118 includes components corresponding to those described for unit 111 and it is the combined output, of the form described for unit 111, which is supplied to the adder 89.

If a colour display is required, the complete system described is necessarily repeated for each primary colour.

What I claim is:

1. In a digitalized visual display system employing a display device having a screen whose area is scanned by a plurality of displaced scanning lines, with each line traversing a number of elemental areas on the screen, and wherein a data signal to be displayed is periodically sampled, and a quantised signal is produced for each data sample and applied to the display device to incrementally create a visual image, the improvement comprising means for improving the resolution of the visual image:

said resolution improving means including means for producing a time displaced series of additional samples of the data signal during the time interval that the scanning beam traverses each elemental area on the screen, means for quantising each of samples to begin and to terminate at a different time than the other quantised samples, and combining means for applying said combined plural quantised samples to the display device for each elemental area, thereby to provide a combined quantised signal that more nearly approximates a corresponding analog variation of the data signal for each elemental area.

2. In the display system of claim 1, said combining means comprising non-additive mixing means for varying the time of application of the quantised signal to said display device with respect to each elemental area.

3. In the display system of claim 1, said combining means comprising additive mixing means for weighting the plural quantised signals and applying the weighted quantised signals to the display device.

4. In the visual display system of claim 1, the additional improvement comprising means for enhancing the resolution of the display in a different dimension, said additional improvement means comprising means operating during the time that each elemental area of each line is being scanned for producing a series of data signals including the data signals for a preceeding line and for succeeding line, and means combining and quantising all of said data signals to produce a combined quantised signal and applying said signal to the visual display device during scanning of each elemental area.

5. In the visual display system of claim 4, the display device comprising a cathode ray tube whose screen is linearly scanned by a series of vertically displaced rectalinear scanning lines, with each line traversing said plurality of elemental areas, and wherein said resolution improving means improves the resolution of the image in the direction of the scanning lines and wherein said additional improvements means improves the image in a direction transverse to the scanning lines.

6. In the visual display system of claim 5, said additional improvement means including buffer storing means, for temporarily storing the data signals for said plurality of lines.

* * * * *